United States Patent

[11] 3,575,184

| [72] | Inventor | John H. Jurkens<br>Waunakee, Wis. (1061 Matador Ave., Albuquerque, N. Mex., 87100) |
|---|---|---|
| [21] | Appl. No. | 803,839 |
| [22] | Filed | Mar. 3, 1969 |
| [45] | Patented | Apr. 20, 1971 |

[54] VEHICLE WASHING APPARATUS
25 Claims, 8 Drawing Figs.

| [52] | U.S. Cl. | 134/45, 134/181 |
|---|---|---|
| [51] | Int. Cl. | B60s 3/04 |
| [50] | Field of Search | 134/45, 123, 181; 15/(Inquired) |

[56] References Cited
UNITED STATES PATENTS

| 3,196,888 | 7/1965 | Rousseau | 134/45 |
| 3,349,783 | 10/1967 | Ellis | 134/45 |
| 3,421,169 | 1/1969 | Hergonson | 134/45X |
| 3,459,203 | 8/1969 | Pritchard | 134/123 |

*Primary Examiner*—Robert L. Bleutge
*Attorney*—Andrus, Sceales, Starke and Sawall ABSTRACT: A vehicle washing apparatus utilizing high pressure liquid spray nozzles. The apparatus includes a pair of side banks, each incorporating a series of rotatable spray nozzles adapted to spray high pressure cleaning liquid against the sides of the vehicle, and a movable carriage carrying a series of spray nozzles is adapted to ride over the top of the vehicle as the vehicle moves through the apparatus to clean the front, top and rear surfaces of the vehicle.

INVENTOR
JOHN H. JURKENS

BY Andrus, Sceales, Starke & Sawall
ATTORNEYS

PATENTED APR 20 1971 3,575,184

INVENTOR.
JOHN H. JURKENS

BY
Andrus, Sceales, Starke & Sawall
ATTORNEYS

VEHICLE WASHING APPARATUS

This invention relates to a vehicle washing apparatus and more particularly to a vehicle washing apparatus utilizing high pressure liquid spray nozzles.

In the typical vehicle washing apparatus, the vehicle is moved by a conveyor through a series of zones or stations where the vehicle is successively washed, air dried and subsequently hand dried. Most existing washing units of this type utilize brushes to clean the sides and top surfaces of the vehicle after the vehicle is sprayed with a washing solution. Even though the brushes are relatively large in size and have soft flexible bristles, the use of brushes nevertheless has serious drawbacks. Initially, the brushes tend to rub any abrasive material or grit located on the vehicle body into the painted surface, thereby often marring or scratching the same. Secondly, the brushes cannot adequately penetrate into all recesses, crevices and other indentations in the vehicle body, with the result that manual labor is usually required to clean the recesses areas and this increases the overall cost of the washing operation.

The use of high pressure liquid has decided advantages over the use of brushes, but to perform satisfactorily the high pressure spray nozzles must be maintained a given distance and attitude from the vehicle at all times. While this can be readily accomplished with side banks incorporating spray nozzles to clean the sides of the vehicle, no satisfactory unit has been devised to adequately clean the front, top and rear of the vehicle using spray nozzles.

The present invention is directed to a vehicle washing apparatus utilizing high pressure liquid spray nozzles to clean all surfaces of the vehicle. According to the invention, the apparatus includes pair of side banks, each of which incorporates a series of rotatable spray nozzles adapted to discharge high pressure cleaning liquid against the sides of the vehicle, and a carriage, carrying a series of rotatable spray nozzles, is adapted to ride over the top of the vehicle to clean the front, top and rear surfaces of the vehicle. More specifically, the carriage is mounted for rotation on a movable overhead frame and in its original or neutral position, at the start of the washing cycle, the carriage is in the path of movement of the vehicle. The carriage includes a series of rotatable, high pressure liquid spray nozzles facing rearwardly in the direction of the approaching vehicle and a series of wheels, mounted for rotation about horizontal axes, are also supported on the carriage and face rearwardly in the direction of the approaching vehicle.

As the vehicle approaches and engages the carriage, the frame moves the carriage forwardly, in accordance with forward movement of the vehicle, so that the spray nozzles on the carriage can adequately clean all portions of the front of the vehicle, such as the bumper, grille, headlights, and the like. After this stroke of forward movement, continued forward movement of the vehicle causes the wheels of the carriage to ride upwardly on the front of the vehicle, over the hood, upwardly over the windshield and across the top of the vehicle. The frame, being freely mounted for vertical pivotal movement, enables the carriage to move vertically as the vehicle passes therebeneath.

As the carriage moves over the top of the vehicle, the frame is moved to the rear to position the carriage to the rear of its original or neutral position. Continued movement of the vehicle causes the wheels of the carriage to ride down the back of the vehicle, and the spray nozzles continue to discharge liquid against the rear surfaces of the vehicle. When the carriage reaches its lowermost portion, to the rear of the vehicle, the frame again moves forwardly so that the carriage can follow forward movement of the vehicle and thereby thoroughly clean all of the rear surfaces of the vehicle, such as the rear bumper and taillights With this action, the spray nozzles carried by the carriage can effectively clean the front, top and rear surfaces of the vehicle.

The wheels on the carriage are designed with sizes and are positioned so that the spray nozzles are maintained at approximately the same distance from the surface of the vehicle at all times during the travel of the carriage thereby insuring a uniform cleaning operation.

As the wheels ride on the front, top and rear surfaces of the vehicle, the carriage rotates 180° during the washing cycle so that the wheels and the spray nozzles, which were originally facing to the rear, face to the front after completion of the cycle. A mechanism is provided to rotate the carriage 180° to its original position after completion of the washing cycle so that the wheels and spray nozzles will be facing the next approaching vehicle. This rotation can be accomplished by counterweights or by a power operated mechanism.

The vehicle washing apparatus of the invention utilizes high pressure spray nozzles, not only for washing the sides of the vehicle, but also the front, top and rear surfaces. The use of the spray nozzles results in a more thorough and complete cleaning of the vehicle for the high pressure liquid can readily penetrate into recesses, crevices and other relatively inaccessible areas. By providing a more thorough cleaning operation, manual labor is minimized.

By eliminating the use of brushes in the apparatus any possibility of scratching or marring the surface of the vehicle due to abrasive rubbing action is correspondingly eliminated.

Other objects and advantages will appear in the course of the following description.

The drawings illustrate the best mode presently contemplated of carrying out the invention.

Figure 1:
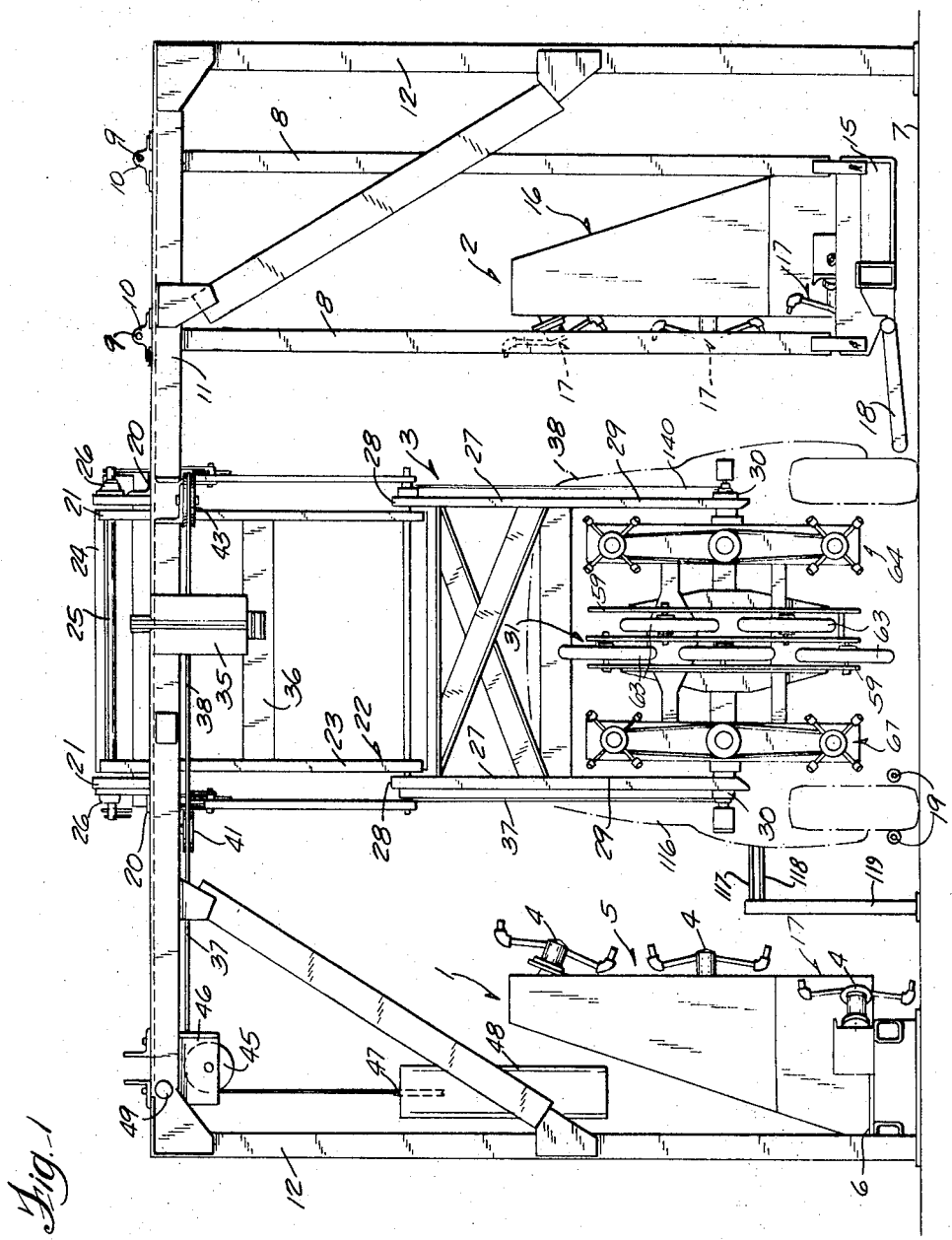
FIG. 1 is an end view of the vehicle washing apparatus of the invention.

As shown in FIGS. 1—8, the vehicle washing apparatus of the invention includes fixed side bank unit 1, a movable side bank unit 2, and a central unit 3. The vehicle to be washed is conveyed by a conveyor, not shown, mounted in the foundation, and as the vehicle passes through the apparatus high pressure liquid from spray nozzles mounted on the side banks 1 and 2 impinge against the sides of the vehicle to clean the same. The central unit 3 which is located in the path of travel of the vehicle, is adapted to ride over the top of the vehicle, as the vehicle moves through the apparatus, and high pressure liquid, being discharged from spray nozzles carried by the central unit 3 impinges against the front, top and rear of the vehicle to clean these surfaces.

The side bank unit 1 is stationary with respect to the foundation and includes a series of high pressure spray nozzles 4 which are mounted for rotation with respect to the housing 5 which contains the drive mechanism for operating the spray nozzles as well as the liquid supply system for supplying the cleaning or detergent solution to the nozzles. Housing 5 is supported on base 6 which in turn is carried by the foundation 7.

The side bank unit 2 is adapted to be moved laterally with respect to the path of travel of the vehicle in order to accommodate vehicles of various widths. The side bank unit 2 includes two pair of vertical supports 8 which are pivotally connected at their upper ends to shafts 9 and shafts 9 are journaled for rocking movement in bearings 10 carried by crossbeams 11. The ends of crossbeams 11 are supported on vertical columns 12 which rest on foundation 7 and are located on either side of the path of travel of the vehicle. The upper ends of columns 12 are also connected together by longitudinal beams 14. The members 11, 12 and 14 comprise a generally U-shaped frame or tunnel through which the vehicle passes as it advances through the washing unit.

The lower ends of the vertical support 8 are connected by a base 15 and a housing 16, similar to housing 5, is mounted on the base. A series of high pressure rotatable spray nozzles 17, similar to spray nozzles 4, are mounted for rotation with respect to housing 16. The housing 16 is in the form of an inverted T, and a series of the spray nozzles 17 are mounted on the horizontal base portion of the T-shaped housing and a second series of nozzles are mounted on the upstanding stem of the T-shaped housing. As in the case of spray nozzles 4, the mechanism for rotating spray nozzles 17, as well as the system for supplying the washing solution to the spray nozzles, is located within the housing 16.

Extending laterally inward from the base 15 is a diagonally extending bar 18 which is adapted to be engaged by the right front tire of the vehicle as it moves into the washing apparatus, while the left front tire rides between the fixed guide bars 19 attached to the foundation. Depending on the width of the vehicle, the right tire will tend to pivot the side bank unit 2 laterally outward about the shafts 9 so that the spray nozzles 17 will be positioned at approximately the same distance from the side of the vehicle regardless of the width of the vehicle. The bar 18 has a length such that at least one wheel of the vehicle will be in engagement with the bar at all times as the vehicle passes through the frame or tunnel. Thus, the engagement of the vehicle tire with the bar 18 controls the spacing between spray nozzles on the side bank units 1 and 2.

As shown in FIG. 1, the spray nozzles 4 and 17 can be canted and located in any desired position on the side bank units 1 and 2 to most effectively clean all surfaces of the side of the vehicle as it passes between the side banks.

To support the central unit 3 from the frame, a pair of longitudinal beams 20 are supported on two rear crossbeams 11 and extend rearwardly beyond the other frame members. A pair of posts or standards 21 extend upwardly from the longitudinal beams 20 and a lift frame 22 is mounted for pivotal movement with respect to posts 21. More specifically, the lift frame 22 includes a pair of generally vertical arms 23 which are connected at their upper ends by a crossmember 24. A shaft 25 is connected to the cross member 24 and the ends of the shaft 25 are journaled within bearings 26 carried by the posts 21. With this construction, the lift frame 22 can be pivoted around the axis of the shaft 25.

As best shown in FIG. 1, a pair of arms 27 are pivotally connected to the lower ends of the arms 23 by a bearing assembly 28. Attached to the forward end of the arms 27 are vertical extensions 29, and the lower ends of extensions 29 carry trunnions 30. A carriage 31, is mounted for rotation with respect to the trunnions 30 carried by the lift frame 22.

To pivot the lift frame 22 with respect to the supporting framework, a pair of back-to-back cylinders 32 are connected by a bracket 33 to the longitudinal beams 20. A piston, not shown, is slidable within each cylinder 32 and piston rods 34 extend from the end of each cylinder. The rearward rod 34 is pivotally connected to a downwardly extending bracket 35 which is carried by the beams 20, while the forward piston rod 34 is connected to a cross member 36 extending between the arms 23.

A counterbalancing mechanism is employed to counterbalance the weight of the lift frame 22 and the carriage 31. The counterbalancing mechanism includes a pair of cables 37 and 38 each being attached to the trunnions 30 at the side edges of the carriage 31. Each of the cables 37 and 38 is reeved over a sheave 39 mounted on a trolley 40. The cables 37 and 38 then pass rearwardly and the cable 37 is reeved about a sheave 41 carried by bracket 42 attached to crossmember 11. Similarly, the cable 38 is reeved about a sheave 43 carried by bracket 44 attached to the opposite surface of the crossmember 11. Cables 37 and 38 then extend laterally and are reeved over sheaves 45 carried by brackets 46 connected to beams 11. The cables 37 and 38 then extend downwardly and around sheaves 47 attached to the counterweight unit 48, and are dead ended, as indicated on 49, on the supporting frame.

The counterweight unit 48 is adapted to contain a series of removable weights and the weight is adjusted so as to counterbalance the weight of the lift frame 22 and the carriage 31.

Figure 6:
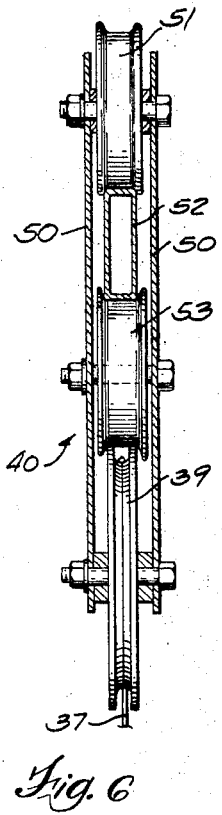
FIG. 6 is a vertical section showing the trolley.

The structure of the trolley 40 is best shown in FIG. 6. Each trolley includes a pair of spaced sideplates 50 and a pair of upper wheels 51 are journaled for rotation between the sideplates 50 and are adapted to ride on the upper surface of a track 52 which is supported by the crossbeams 11. In addition to the upper wheels 51, a pair of lower wheels 53 are journaled between the sideplates and ride on the lower surface of the track.

To provide a connection between each trolley 40 and the lift frame 22, an arm 54 is connected between the trolley and the pivotal connection 28 between the arms 23 and 27. The arm 54 insures that the trolley will move with movement of the frame 22 and carriage 31, so that the portion of the cables 37 and 38 extending downwardly from the trolley to the carriage unit will remain substantially plumb at all times.

To provide a limit for the downward movement of the lift frame and carriage 31, a dashpot 55 is connected to each of the cables 37 and 38 and as the lift frame moves downwardly, each dashpot 55 is adapted to engage a resilient bumper 56 mounted on the trolley 40. Engagement of the dashpot 55 with the bumper 56 provides a dampened stopping motion for the lift frame 22 which prevents bouncing and accurately positions the carriage 31 above the foundation 7.

Figure 4:
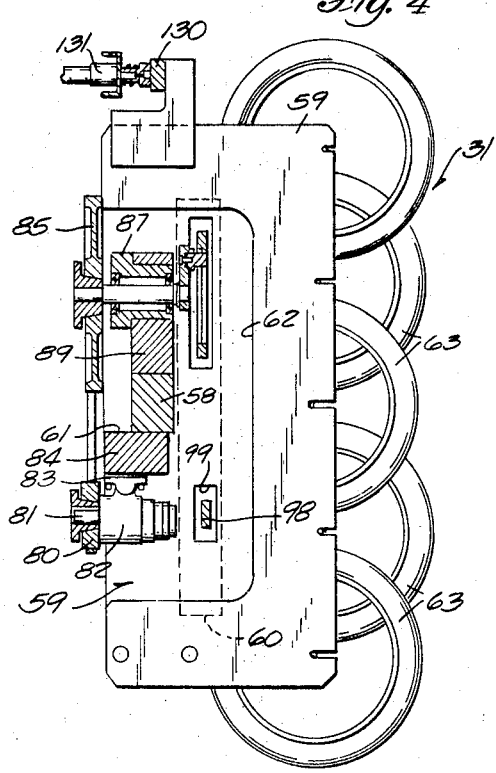
FIG. 4 is a section taken along lines 4—4 of FIG. 3.

The carriage 31 includes a generally horizontal frame member 58, and a series of generally parallel vertical plates 59 are secured to the frame 58 and extend to the rear toward the approaching vehicle when the carriage 31 is in its original or neutral position at the start of the washing cycle. The two outer plates 59 are connected to the frame 58 by angle supports 60. As best shown in FIG. 4, the rear edge of each of the two end plates 59 is provided with a notch 61 which receives the generally rectangular frame 58. In addition, the central portion of the middle plate 59 is provided with a large recess 62 to permit the drive mechanism to pass therethrough. A series of wheels 63 are mounted in two vertical rows between the parallel plates 59. As shown in the drawings, there are five wheels 63, which are located in two vertical rows with axes of the wheels being offset vertically. The wheels 63 are provided with flexible or resilient coverings, such as pneumatic tires, and as the vehicle or car moves into engagement with the carriage 31 the wheels ride against the front end of the car, upwardly over the hood and windshield, across the top of the car and downwardly along the rear of the car. Due to the counterbalancing effect of the counterweight 48 very little force is required to lift the frame 22, thereby enabling the carriage 31 to move over hard top vehicles as well as convertibles or soft tops.

A pair of spray nozzle arms 64, each of which carries a pair of spray nozzles, are mounted for oscillating movement on the ends of frame 58. As shown best in FIG. 5, a sleeve 65 is secured to each arm 64 and the sleeve is journaled within an opening in the frame 58 by a bearing assembly 66.

Figure 5:
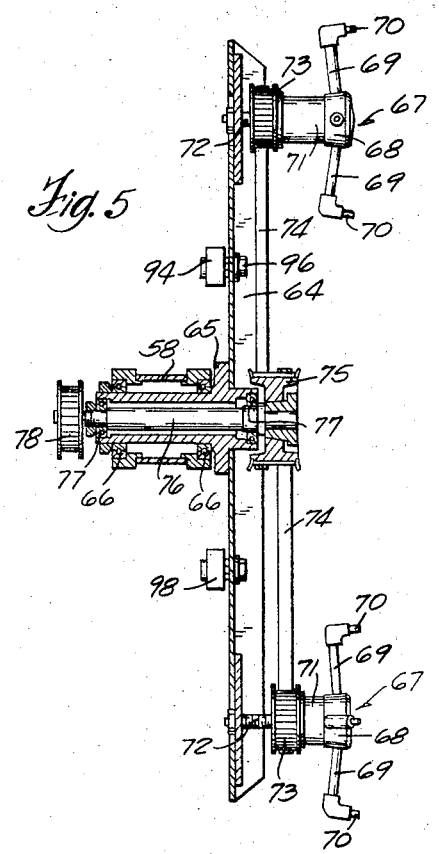
FIG. 5 is a section taken along lines 5—5 of FIG. 3.

A spray nozzle assembly 67, is mounted for rotation on each end of each arm 64. As best shown in FIG. 5, each spray nozzle assembly 67 includes a body portion 68 and a series of tubular arms 69 extend outwardly in a radial direction from the body 68. The end of each arm 69 carries a nozzle 70 through which the high pressure cleaning or detergent solution is discharged toward the vehicle.

The body 68 of each nozzle assembly 67 is secured to the outer end of a hub 71, and the body 68 and hub 71 are journaled for rotation about a central shaft 72 that extends outwardly from the arm 64.

To introduce cleaning solution to each nozzle assembly 67, a hose, not shown, is connected to a central passage in shaft 72 and the passage in turn is connected to the hollow interior of body 68 so that the cleaning solution will be discharged through each arm 69 to the respective nozzles 70.

As best shown in FIG. 5, the nozzles 70 are canted or disposed at an angle with respect to the axis of the shaft 72. This outward canting of the nozzles prevents reflection of spray upon itself and increases the spray pattern of the nozzles and thereby enables each nozzle to cover a greater area of the vehicle.

To rotate each spray nozzle assembly 67 about the shaft 72, a pulley 73 is attached to each hub 71 and the pulleys 73 are connected by belts 74 to a central pulley 75. Central pulley 75 is mounted on shaft 76 journaled within the sleeve 65 by bearing assemblies 77. With this construction, the central shaft 76 can rotate independently of the rotation of the sleeve 65 which is secured to the arm 64.

Figure 7:
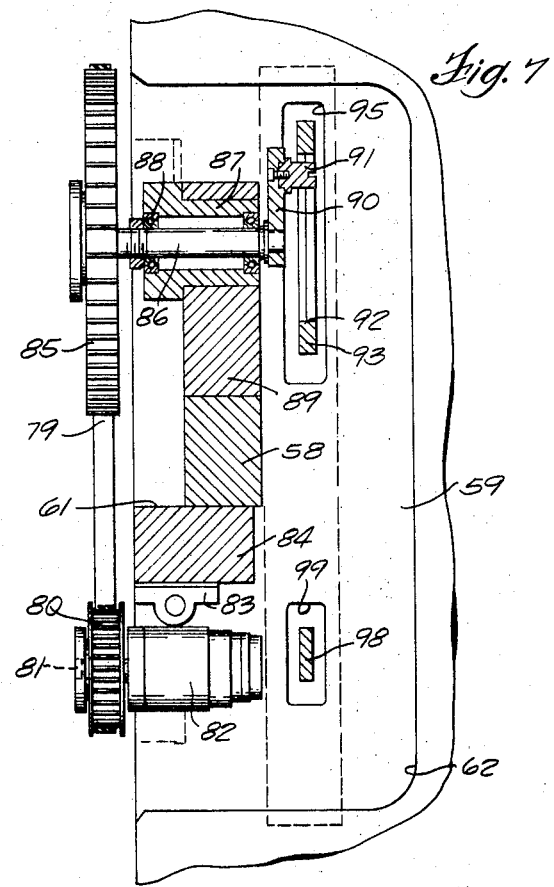
FIG. 7 is an enlarged vertical section similar to FIG. 4.
Figure 8:
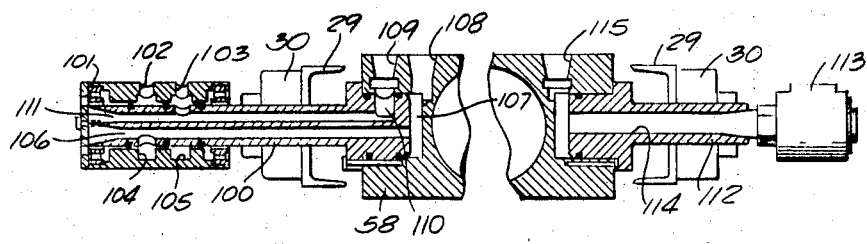
FIG. 8 is a longitudinal section of the central frame of the carriage.

Secured to the outer end of the shaft 76 is a pulley 78, and the pulley 78 associated with each of the arms 64 is connected by a belt 79 to a drive pulley 80 secured to the end of the motor drive shaft 81. Shaft 81 is driven by hydraulic motor 82 secured through mounting bracket 83 to pad 84, and the pad in turn is connected to the lower surface of the frame 58, as shown in FIG. 7.

A provision is made to oscillate each arm 64 about its point of pivotal connection to the frame 58 in order to increase the area of discharge of the nozzle assemblies 67. To provide this oscillating motion, a pulley 85 driven by belt 79 is secured to a shaft 86, and the shaft is mounted for rotation within a hub 87 by a bearing assembly 88. The hub is carried by a pad 89 secured to the upper surface of the frame 58, as shown in FIG. 7.

Connected to the outer end of the shaft 86 is a crank arm 90 and the outer end of the crank arm 90 carries a pin 91 which rides in a vertical slot 92 of yoke 93. The ends 94 of the yoke 93 extend through slots 95 in the angle brackets 60 and are pivotally connected by pins 96 to the arms 64. Suitable wear strips 97 are secured to the vertical edges of the slot 92 to prevent wear of the slot edges as the pin 91 moves therein. The lower ends of the arms 64 are connected together by a tie bar 98 which also extends through openings 99 in the end plates 59 and in the angle supports 60.

Figure 3:
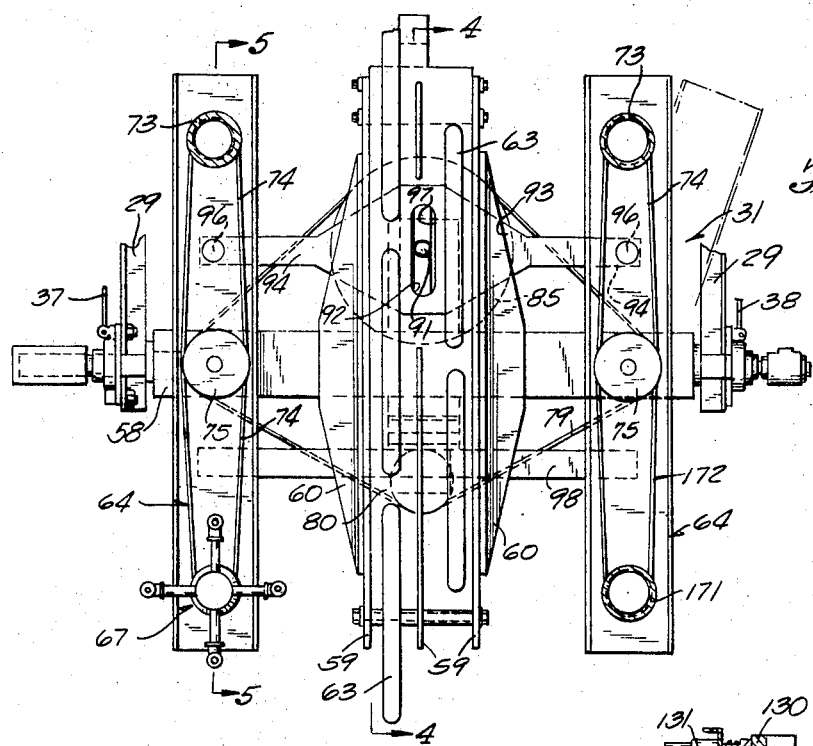
FIG. 3 is a plan view of the carriage of the apparatus shown in FIGS. 1 and 2.

As the crank arm 90 is rotated by operation of the belt 79, the pin 91 will move within the slot 92 and provides the yoke with an oscillating motion to thereby move the arms 64 from the vertical position as shown in FIG. 3 to the phantom position in that figure. As previously described, the oscillating motion provided for the spray nozzles 67 increases the discharge pattern for the nozzles and thereby increases the effectiveness of the cleaning operation.

To supply hydraulic fluid to the motor 82 mounted on the rotatable carriage 31, a shaft 100 projects outwardly from the end of frame 58 and shaft 100 is journaled within the trunnion 30. The outer portion of the shaft carries a manifold block 101 which is provided with a radially extending inlet 102 and an outlet 103, with the inlet 102 being connected to the discharge side of the hydraulic pump and the outlet 103 connected to the reservoir. The inlet 102 is in communication with a circumferential groove 104 in the manifold 101 and similarly the outlet 103 is in communication with a second groove 105. Groove 104 is connected to a longitudinal passage 106 in shaft 100 which in turn is connected to a radial passage 107 that is in communication with an outlet 108. Outlet 108 is connected by a hose, not shown, to the motor 82. Hydraulic fluid is thus discharged through the passages 106, 107, and 108 to the hydraulic motor 82. Fluid being returned from the motor 82 is discharged through a hose into inlet 109 which communicates with radial passage 110, and radial passage is connected by longitudinal passage 111 to the outlet 103. Thus, the fluid being returned from the motor passes through the passages 109, 110 and 111 to the outlet 103.

The opposite end of the frame 58 carries a shaft 112 which is journaled within the trunnion 30, and an adapter 113 connects the axial passage 114 in shaft 112 with a line connected to a source of cleaning solution. The solution passes from the central passage 114 through a radial passage to the outlet 115 which is connected by a suitable manifold to the four nozzle assemblies 67 located on the arms 64.

At the start of the washing cycle, the carriage 31 is positioned above the foundation 7 in the path of travel of the vehicle 116 with the wheels 63 facing the approaching vehicle. The vehicle is moved through the washing unit by a conveyor which is mounted in the foundation 7 and engages the left-hand wheels of the vehicle. As the vehicle advances, the right-hand wheels engages the guide bar 18 to pivot the movable side bank unit 2 outwardly, with the degree of movement depending on the width of the vehicle. As the front end of the vehicle engages the wheels 63, limit switches 117 and 118 carried by post 119 are actuated. Actuating of switch 117 opens a valve in the cleaning solution line to supply cleaning solution through the adapter 113 to the spray nozzles 67. Simultaneously, actuation of the limit switch 118 serves to introduce hydraulic fluid into the right-hand cylinder 32, as viewed in FIG. 2, to extend the piston rod and thereby move the lift frame 22 and the carriage 31 forwardly in accordance with the movement of the vehicle. As the carriage 31 moves generally horizontally from its original or neutral position at plane A to the plane B, shown FIG. 2, the spray nozzles 67 eject the high pressure fluid against the front end of the vehicle, namely the bumper, grille, headlights and other areas to effectively clean the front end of the vehicle. When the carriage 31 reaches the end of its forward stroke of travel, continued movement of the vehicle 117 will cause the wheels 63 to climb upwardly over the hood, windshield and top of the vehicle. During this time the spray nozzles 67 are continuously oscillating and ejecting the cleaning solution on the surface of the vehicle and the wheels 63 serve to uniformly space the spray nozzle assemblies from the surface of the vehicle.

When the lift frame 22 has been elevated to a given level, a limit switch 120 mounted on bracket 121 carried by one of the lift arms 27 is actuated by brace 54. Actuation of switch 120 operates to introduce hydraulic fluid to both cylinders 32 to retract the piston rods of both cylinders, thereby moving the lift frame 22 and the attached carriage 31 rearwardly in a rearward stroke of movement from plane B to plane C. This rearward stroke of movement occurs as the carriage is riding on the top of the vehicle. When the carriage 31 completes its descent along the rear of the vehicle 117, the brace 54 actuates a limit switch 122 carried by bracket 123 mounted on lift arm 27 to introduce hydraulic fluid into the right-hand end of the left cylinder 32, as viewed in FIG. 2, to thereby move the lift frame 22 and the carriage in a forward stroke of movement, from position C to position A, following the rear of the vehicle as it continues to move through the apparatus. When the lift frame 22 and carriage 31 have reached their original position at plane A, the forward movement is stopped and the carriage then rotates 180° so that the wheels 63 will again be facing rearwardly in position to be engaged by the next succeeding vehicle passing through the washing unit.

Figure 2:
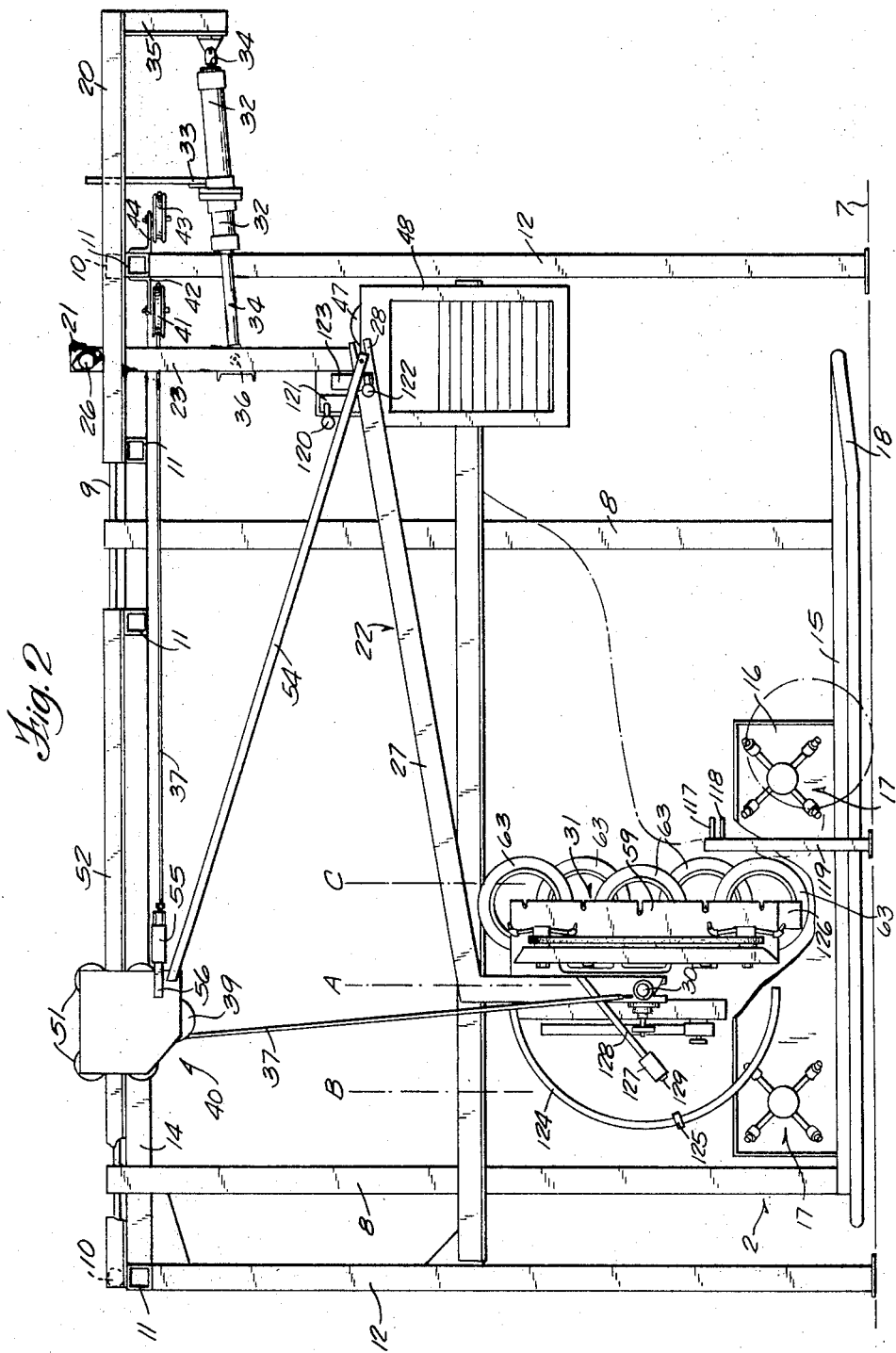
FIG. 2 is a side elevation of the apparatus shown in FIG. 1 with the side banks of spray nozzles removed.

To rotate the carriage 31 to its original position after completion of the washing cycle, a counterweight mechanism is utilized. As best shown in FIG. 2, a generally semicircular frame 124 extends from the plates 59 and a weight 125 is movable on the frame. By positioning the weight 125 along the curved guide frame 124, a static balance is achieved for the carriage 31 so that the arms 64 and nozzles 67 can be located at the desired attitude or angle which is generally vertical at the start of operation. In addition to the static balance weight 125, a pair of counterweights are employed to rotate the carriage 31 and return it to its original position at the completion of the washing cycle. A counterweight 126 is attached to the lower ends of a pair of plates 59 and is positioned so that when the carriage is in the reverse or inverted position at the end of the washing cycle, the counterweight 126 will be located at a level above the level of the trunnions 30 and will act to pivot the carriage about the trunnions 30 to start the rotational movement. In addition to the weight 126, a sliding counterweight 127 is mounted for sliding movement on rod 128 which is attached to the carriage and extends downwardly and forwardly when the carriage is in its original position. A nut 129 or resilient stop is connected to the lower end of the rod 128 to retain the counterweight 127 on the rod.

At the completion of the washing cycle when the carriage is in the inverted position, the wheels 63 and spray nozzles 67 are facing toward the rear of the vehicle 117 which has passed through the washing zone, and the rod 128 will be extending upwardly and to the rear. As the vehicle moves out of engagement with the carriage, the offset position of the weight 126 will start or initiate rotation of the carriage 31 about the trunnions 30, and after the carriage has rotated through a given arc, the rod 128 will be inclined downwardly and the counterweight 127 will slide downwardly along the inclined rod 128 to provide an increased speed of rotation to return the carriage to its original position. To dampen the return rotational movement, a resilient bumper 130 is mounted on the end of the carriage, and engages a dashpot 131 carried by the lift frame 22, as shown in FIG. 4. After returning to its original position the wheels 63 and spray nozzles 67 will again be facing to the rear in position to be contacted by the next succeeding approaching vehicle.

While the drawings illustrate a counterweight mechanism for rotating the carriage 31 to its original position after the washing cycle, a power operated mechanism can be employed to provide this function.

I claim:

1. In an apparatus for washing a vehicle as the vehicle moves through the apparatus, a frame, a carriage mounted for rotation on the frame about a horizontal axis and disposed in the path of travel of the vehicle as it moves through the apparatus, liquid ejection means mounted on the carriage and facing to the rear in a direction toward the approaching vehicle for discharging high pressure liquid against the surface of the vehicle, guide means disposed on the carriage and facing to the rear in the direction toward the approaching vehicle and disposed to ride over the surface of the vehicle as the vehicle moves through the apparatus, means for mounting the carriage for movement in a vertical plane to permit the carriage to ride over the upper surface of the vehicle, and means for moving the carriage in a generally horizontal plane, said last named means being operable to move the carriage in a first forward stroke of movement as the vehicle approaches the carriage to thereby enable the liquid ejection means to effectively clean the forward surfaces of the vehicle, and said last named means being operable as said carriage rides down the rear surface of the vehicle to move the carriage in a second forward stroke of movement to enable the carriage to follow the rear of the vehicle and effectively clean the rear surfaces thereof.

2. In an apparatus for washing a vehicle as the vehicle moves through the apparatus, a frame, a carriage mounted for rotation on the frame about a horizontal axis and disposed in the path of travel of the vehicle, liquid ejection means mounted on the carriage and facing rearwardly in a direction towards the approaching vehicle for ejecting high pressure cleaning liquid against the surface of the vehicle, guide means disposed on the carriage and facing rearwardly and disposed to be engaged by the vehicle and ride over the upper surface of the vehicle as the vehicles moves through the apparatus, means for mounting the frame for movement in a vertical plane so that the carriage can follow the contour of the vehicle, means responsive to the vehicle approaching the carriage for moving the carriage forwardly in accordance with forward movement of the vehicle in a first forward stroke of movement to enable the liquid ejection means to effectively clean the front surfaces of the vehicle, and means responsive to the carriage riding down the rear of the vehicle to a predetermined position for moving the carriage forwardly in a second stroke of movement to follow the rear surface of the vehicle and enable the liquid ejection means to effectively clean said rear surfaces.

3. The apparatus of claim 1, wherein said guide means comprises a series of wheels journaled about horizontal axes.

4. The apparatus of claim 3, wherein said wheels are disposed in at least two vertically aligned rows with the axes of the wheels in one row being vertically offset from the axes of the wheels in adjacent rows.

5. The apparatus of claim 1, wherein said ejection means comprises a series of rotatable spray nozzles.

6. The apparatus of claim 5, wherein said rotatable spray nozzle comprises a body mounted for rotation with respect to the carriage, a series of arms extending generally radially from the body, a discharge nozzle connected to the outer end of each arm, and means for rotating said body.

7. The apparatus of claim 6, wherein the axes of the discharge nozzles are disposed at an angle to the axis of rotation of the body to thereby increase the pattern of discharge of the nozzles.

8. The apparatus of claim 1, wherein said ejection means includes a series of arms mounted for oscillating motion with respect to the carriage, and a series of rotatable spray nozzles mounted on said arms.

9. The apparatus of claim 1, wherein said liquid ejection means comprises a pair of arms mounted for oscillating movement on said carriage, a plurality of liquid spray nozzles mounted for rotation on each arm, drive means on the carriage, first connecting means connecting the drive means to the nozzles to rotate the nozzles, and second connecting means connecting the drive means with each arm for oscillating the arms with respect to the carriage.

10. The apparatus of claim 1, wherein said frame includes a pair of trunnions and the side portions of the carriage are mounted for rotation with respect to said trunnions.

11. The apparatus of claim 10, wherein said carriage includes a central supporting structure and a shaft extends outwardly from each end of the supporting structure and is journaled for rotation in one of said trunnions.

12. The apparatus of claim 11, and including means connected through one of said shafts for supplying cleaning liquid to said liquid ejection means.

13. The apparatus of claim 1, and including counterbalancing means for counterbalancing at least a substantial portion of the weight of the frame and carriage.

14. In an apparatus for washing a vehicle as the vehicle moves through the apparatus, a supporting structure, means for mounting the supporting structure for movement in a substantially vertical plane, a carriage mounted on the supporting structure for rotation about a horizontal axis, said carriage including a frame member, a series of rotatable guide members mounted for rotation on said frame member about axes transverse to the direction of travel of the vehicle, said guide members facing rearwardly in the direction toward the approaching vehicle, a series of rotatable spray nozzles mounted on the frame member of the carriage and facing rearwardly and disposed to discharge a high pressure cleaning liquid against the surface of the vehicle, and drive means mounted on the carriage for rotating said spray nozzles, said carriage arranged to ride over the top surface of the vehicle as the vehicle passes through the apparatus with said liquid being discharged through said nozzles to effectively clean the front, upper and rear surfaces of the vehicle as the carriage rides thereover, said carriage pivoting with respect to the supporting structure as the carriage rides over the vehicle and said carriage being displaced approximately 180° from its original position at the end of the washing cycle, whereby said guide members and said spray nozzles face forwardly.

15. The apparatus of claim 14, wherein said supporting structure includes a pair of trunnions and a shaft extends outwardly from each end of the frame member of the carriage and is journaled in one of said trunnions, said apparatus also including means connected through one of said shafts for supplying cleaning liquid to the spray nozzles, and means connected through the other of said shafts for supplying hydraulic fluid to said drive means.

16. The apparatus of claim 14, and including a pair of arms mounted for oscillating movement on the frame member of the carriage, said nozzles being mounted for rotation on said arms, and means interconnecting the drive means and said arms for oscillating the arms with respect to the frame member.

17. The structure of the apparatus of claim 14, and including a foundation to support the supporting structure and means for positioning the carriage above the foundation at the start and completion of the washing cycle.

18. The apparatus of claim 14, and including means for moving the carriage in a generally horizontal plane whereby the carriage can follow ahead of the front of the vehicle as the vehicle approaches the apparatus and the carriage can follow the rear of the vehicle as the vehicle as the vehicle moves past the apparatus.

19. The apparatus of claim 2, and including means responsive to the vehicle approaching the carriage for supplying liquid to the liquid ejection means.

20. In an apparatus for washing a vehicle as the vehicle moves through the apparatus, a frame, a carriage mounted for rotation on the frame about a horizontal axis and disposed in the path of travel of the vehicle, liquid ejection means mounted on the carriage and facing rearwardly in a direction toward the approaching vehicle for ejecting high pressure cleaning liquid against the surface of the vehicle, guide means disposed on the carriage and facing rearwardly and disposed to be engaged by the vehicle and ride over the upper surface of the vehicle as the vehicle moves through the apparatus, means for mounting the frame for movement in a vertical plane so that the carriage can follow the contour of the vehicle, means responsive to the vehicle approaching the carriage for moving the carriage from its original position in a forward stroke of movement in the direction of vehicle travel to a second forward position to enable the liquid ejection means to effectively clean the front surfaces of the vehicle, means responsive to the carriage being elevated to a given position for moving the carriage in a rearward stroke of movement to position the carriage in a third rear position to the rear of said original position, and means responsive to the carriage riding down along the rear surface of the vehicle to a predetermined level for moving the carriage in a second forward stroke of movement to return the carriage to its original position and enable the carriage to follow the rear surface of the moving vehicle.

21. The apparatus of claim 14, and including means for rotating the carriage approximately 180° at the completion of the washing cycle to reposition the guide members and spray nozzles in a rearward facing position.

22. The apparatus of claim 21, wherein said means for rotating the carriage comprises a counterweight.

23. The apparatus of claim 21, wherein said means for rotating the carriage comprises a pair of counterweights, one of said counterweights being positioned to initiate rotation of the carriage from the displaced position to the original position and the other of the counterweights being arranged to provide an increased speed of rotation for the carriage after said initial rotation.

24. The apparatus of claim 23, and including stop means mounted on the supporting structure and disposed to be engaged by the carriage to limit the return rotational movement of the carriage and locate the carriage in its original position.

25. The apparatus of claim 14, and including static balance means for providing a static balance for the carriage when it is in its original position to maintain said spray nozzles in a substantially vertical plane.